United States Patent
Muramatsu (10) Patent No.: US 10,998,769 B2
(45) Date of Patent: May 4, 2021

(54) POWER TRANSMISSION CIRCUITRY, POWER RECEPTION CIRCUITRY, WIRELESS POWER TRANSMISSION SYSTEM, AND WIRELESS POWER TRANSMISSION METHOD

(71) Applicant: FUJITSU LIMITED, Kawasaki (JP)

(72) Inventor: Atsushi Muramatsu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 157 days.

(21) Appl. No.: 15/979,637

(22) Filed: May 15, 2018

(65) Prior Publication Data

US 2018/0337558 A1    Nov. 22, 2018

(30) Foreign Application Priority Data

May 17, 2017 (JP) .............................. JP2017-098013

(51) Int. Cl.
| | |
|---|---|
| *H02J 7/00* | (2006.01) |
| *H02J 7/14* | (2006.01) |
| *H02J 50/12* | (2016.01) |
| *H02J 7/02* | (2016.01) |
| *H04W 52/04* | (2009.01) |
| *H02J 50/80* | (2016.01) |
| *H02J 50/05* | (2016.01) |
| *H04W 52/36* | (2009.01) |

(Continued)

(52) U.S. Cl.
CPC ............ *H02J 50/12* (2016.02); *H02J 7/0013* (2013.01); *H02J 7/025* (2013.01); *H02J 50/05* (2016.02); *H02J 50/40* (2016.02); *H02J 50/80* (2016.02); *H04W 52/04* (2013.01); *H04W 52/247* (2013.01); *H04W 52/367* (2013.01); *H02J 7/00034* (2020.01)

(58) Field of Classification Search
USPC ........................................................ 320/108
See application file for complete search history.

(56) References Cited

U.S. PATENT DOCUMENTS

| | | | |
|---|---|---|---|
| 9,923,386 B1 * | 3/2018 | Leabman ................ | H02J 50/20 |
| 2012/0261998 A1 * | 10/2012 | Sato ....................... | H02J 50/90 |
| | | | 307/80 |
| 2013/0002036 A1 | 1/2013 | Kamata | |

(Continued)

FOREIGN PATENT DOCUMENTS

| | | |
|---|---|---|
| JP | 2013-034367 | 2/2013 |
| JP | 2013-055871 | 3/2013 |

(Continued)

OTHER PUBLICATIONS

JPOA—Japanese Office Action dated Jan. 5, 2021 for corresponding Japanese Patent Application No. 2017-098013, with English Translation, 13 pages.

*Primary Examiner* — Alexis B Pacheco
(74) *Attorney, Agent, or Firm* — Fujitsu Patent Center (57) ABSTRACT

A power transmission circuitry transmits power wirelessly to a plurality of power reception circuitry simultaneously. The power transmission circuitry includes, a communication circuit that wirelessly receives information on receiving power of the plurality of power reception circuitry, and a transmitting power control circuit that controls transmitting power based on the information on receiving power of the plurality of power reception circuitry received by the communication circuit.

3 Claims, 10 Drawing Sheets

(51) Int. Cl.
*H02J 50/40* (2016.01)
*H04W 52/24* (2009.01)

(56) References Cited

U.S. PATENT DOCUMENTS

| | | | |
|---|---|---|---|
| 2013/0334895 A1* | 12/2013 | Yamamoto | H02J 5/005 |
| | | | 307/104 |
| 2015/0008755 A1 | 1/2015 | Sone | |
| 2015/0349574 A1* | 12/2015 | Leabman | H02J 7/345 |
| | | | 320/108 |
| 2016/0056665 A1* | 2/2016 | Hatanaka | H02J 7/00043 |
| | | | 320/106 |
| 2017/0104368 A1* | 4/2017 | Radke | H02J 50/12 |
| 2018/0048178 A1* | 2/2018 | Leabman | H02J 50/90 |
| 2018/0090995 A1 | 3/2018 | Arasaki et al. | |
| 2018/0226842 A1 | 8/2018 | Uchida et al. | |

FOREIGN PATENT DOCUMENTS

| | | |
|---|---|---|
| JP | 2014-138507 | 7/2014 |
| JP | 2015-12761 A | 1/2015 |
| JP | 2016-220394 A | 12/2016 |
| WO | 2016/159093 A1 | 10/2016 |
| WO | 2017/061030 A1 | 4/2017 |

* cited by examiner

POWER TRANSMISSION CIRCUITRY, POWER RECEPTION CIRCUITRY, WIRELESS POWER TRANSMISSION SYSTEM, AND WIRELESS POWER TRANSMISSION METHOD

CROSS-REFERENCE TO RELATED APPLICATION

This application is based upon and claims the benefit of priority of the prior Japanese Patent Application No. 2017-098013, filed on May 17, 2017, the entire contents of which are incorporated herein by reference.

FIELD

The embodiments discussed herein are related to a power transmission circuitry, a power reception circuitry, a wireless power transmission system and a wireless power transmission method.

BACKGROUND

In recent years, attention has been paid to a wireless power transmission (which may be also called a wireless power transfer, a contactless power transmission, or a wireless power feeding) technology for wirelessly transmitting power in order to supply power to a device or charge a device with power. For example, research and development (R&D) has been performed on wireless power transmission circuitry that wirelessly transmit power to power reception circuitry such as various electronic devices and home appliances including mobile terminals, notebook computers and personal computers, and power infrastructure devices such as automobiles.

In the related art, techniques using electromagnetic induction or radio waves have been applied for such wireless power transmission circuitry. In recent years, it has been expected to use magnetic field resonance capable of wirelessly transmitting power while keeping a distance between a power transmission circuitry (power transmitter) and a power reception circuitry (power receiver: an electronic device) to some extent.

Since a power transmission circuitry using the magnetic field resonance may transmit power of several W or more to a place distant from several centimeters to several tens of centimeters, the power transmission circuitry may be applied to, for example, electronic devices, home appliances, or power infrastructure devices. The application of this embodiment is not limited to the wireless power transmission using strongly-coupled resonance such as magnetic field resonance or electric field resonance. For example, electromagnetic induction may be used as well as long as the power can be wirelessly transmitted to plural power reception circuitry simultaneously.

In the related art, various proposals have been made to perform a wireless power transmission using the magnetic field resonance.

Related techniques are disclosed in, for example, Japanese Laid-Open Patent Publication Nos. 2013-034367, 2014-138507, and 2013-055871.

SUMMARY

According to an aspect of the embodiments, a power transmission circuitry transmits power wirelessly to a plurality of power reception circuitry simultaneously. The power transmission circuitry includes, a communication circuit that wirelessly receives information on receiving power of the plurality of power reception circuitry, and a transmitting power control circuit that controls transmitting power based on the information on receiving power of the plurality of power reception circuitry received by the communication circuit.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

It is generally possible in principle to simultaneously transmit power to plural power reception circuitry in the wireless power transmission. However, when power is simultaneously transmitted to the plural power reception circuitry, it is difficult to send appropriate power to all the power reception circuitry without waste. This is because the power received by each power reception circuitry is not uniform due to the positional relationship with a power transmission circuitry, and the power (required power) required by each power reception circuitry varies depending on the operating condition of each power reception circuitry and the degree of charge of a secondary battery.

That is, for example, when the power transmitted from a power transmission circuitry is controlled based on a power reception circuitry with a high power reception efficiency or with small required power, power (receiving power) received from the power transmission circuitry is insufficient for a power reception circuitry with a low power reception efficiency or with large required power. On the contrary, for example, when the power transmitted from the power transmission circuitry is controlled based on the power reception circuitry with a low power reception efficiency, in the power reception circuitry with high power reception efficiency or small required power, there is a concern that the device may be damaged or the power may be unnecessarily increased due to the unnecessary power.

Further, for example, when a power transmission circuitry always transmits the maximum power without any control and the excessive power is discarded on the power reception circuitry side, the maximum power is constantly consumed regardless of the number of power reception circuitry or the required power, which results in a decrease in the efficiency of the entire system. Furthermore, when the control to lower the transmitting power is performed because there is even one power reception circuitry that has excessive power, it is difficult to feed appropriate power simultaneously to all the power reception circuitry as long as there is even one power reception circuitry with large receiving power or small required power.

Figure 1:
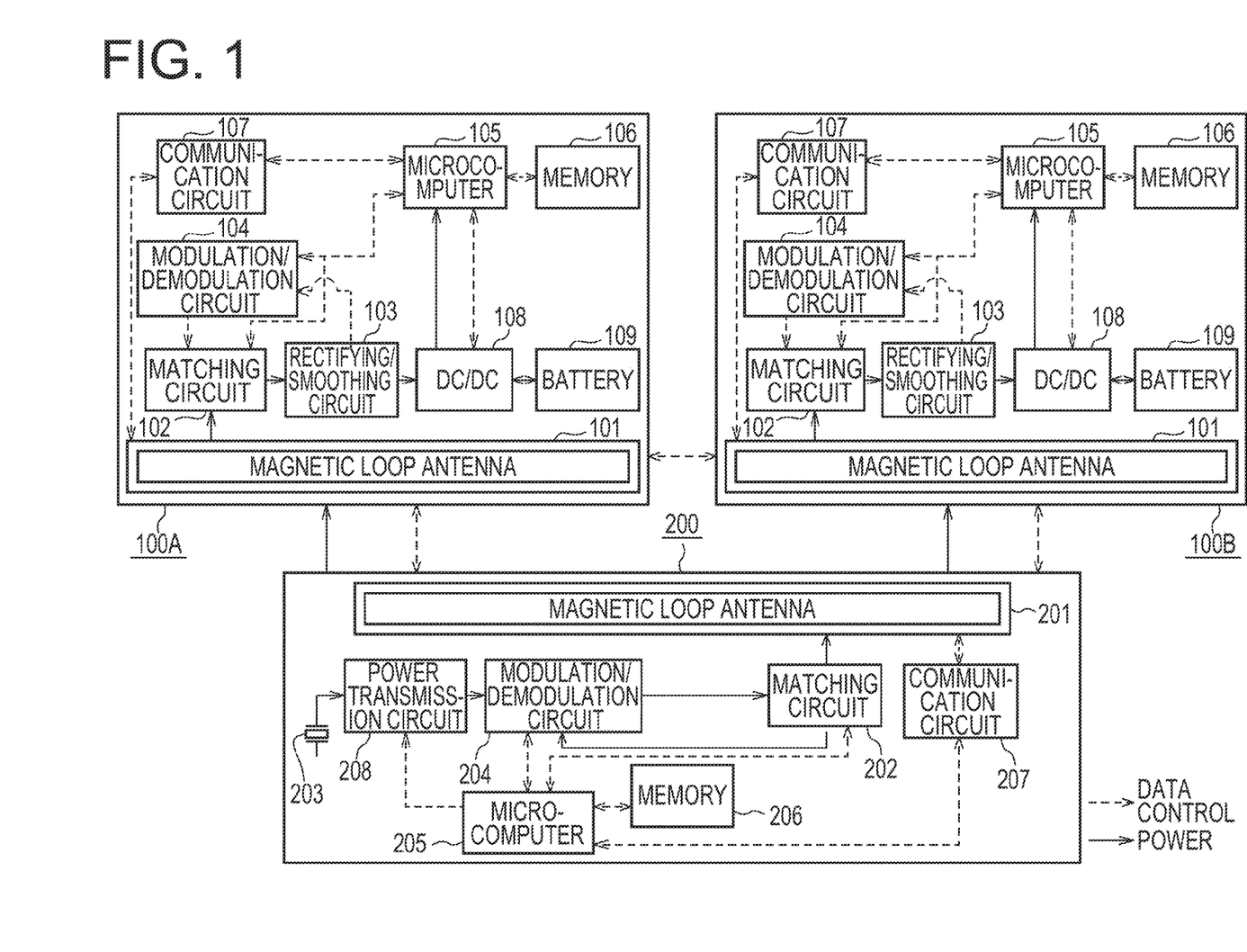
FIG. 1 is a block diagram illustrating an example of a wireless power transmission system.

First, prior to describing embodiments of a power transmission circuitry, a power reception circuitry, a wireless power transmission system, and a wireless power transmission method, an example of a wireless power transmission system will be described with reference to FIG. 1. FIG. 1 is a block diagram illustrating an example of the wireless power transmission system. As illustrated in FIG. 1, the wireless power transmission system includes one power transmission circuitry 200 and plural power reception circuitry 100A and 100B. The power transmission circuitry 200 is able to wirelessly transmit power to the plural power reception circuitry 100A and 100B simultaneously, by using, for example, the magnetic field resonance. While FIG. 1 illustrates only two power reception circuitry 100A and 100B, the wireless power transmission system may include more than two power reception circuitry.

As illustrated, the power reception circuitry 100A and 100B have the same configuration with each other and include a magnetic loop antenna 101, a matching circuit 102, a rectifying/smoothing circuit 103, a modulation/demodulation circuit 104, and a micro control unit (MCU) 105. The power reception circuitry 100A and 100B further include a memory 106, a communication circuit 107, a DC/DC converter 108, and a battery 109. The power transmission circuitry 200 includes a magnetic loop antenna 201, a matching circuit 202, an oscillator 203, a modulation/demodulation circuit 204, a microcomputer (MCU) 205, a memory 206, a communication circuit 207, and a power transmission circuit 208. The power reception circuitry 100A and 100B may have different configurations with each other but include the magnetic loop antenna 101, the microcomputer 105, and the communication circuit 107.

The magnetic loop antenna 101 in each of the power reception circuitry 100A and 100B receives power from the magnetic loop antenna 201 of the power transmission circuitry 200, by using, for example, the magnetic field resonance. In the power reception circuitry 100A (100B), the output (AC voltage) of the magnetic loop antenna 101 is rectified and smoothed into a DC voltage by the rectifying/smoothing circuit 103 via the matching circuit 102 and converted into a predetermined stabilized voltage by the DC/DC converter 108. Then, the battery 109 is charged with an output voltage of the DC/DC converter 108. Here, the plural power reception circuitry 100A and 100B may wirelessly receive the power from the power transmission circuitry 200 simultaneously.

In the power reception circuitry 100A (100B), the matching circuit 102 performs an impedance matching by controlling the values of the inductance and the capacitance of the matching circuit 102 so that the magnetic loop antenna 101 resonates at the same frequency as the resonance frequency of the power transmission circuitry 200. The power reception circuitry 100A (100B) is provided with, for example, the modulation/demodulation circuit 104 and the communication circuit 107, to communicate with the power transmission device 200 provided with, for example, the modulation/demodulation circuit 204 and the communication circuit 207. In addition, the power reception circuitry 100A and 100B may also communicate with each other.

However, in the wireless power transmission system illustrated in FIG. 1, the power received by each of the power reception circuitry 100A and 100 B becomes non-uniform according to the positional relationship with the power transmission circuitry 200. That is, the power received by each of the power reception circuitry 100A and 100B is different according to, for example, the relative position or distance between the magnetic loop antenna 101 of the power reception circuitry 100A (100B) and the magnetic loop antenna 201 of the power transmission circuitry 200. This makes it difficult to send appropriate (proper) power to all the power reception circuitry without waste.

Hereinafter, embodiments of a power transmission circuitry, a power reception circuitry, a wireless power transmission system, and a wireless power transmission method will be described in detail with reference to the accompanying drawings. It is here assumed that the wireless power transmission system includes a single power transmission circuitry 2 and plural power reception circuitry 1. The power transmission circuitry 2 is able to transmit power wirelessly and simultaneously to the plural power reception circuitry 1. First, the outline of the wireless power transmission system of this embodiment will be described.

The power reception circuitry 1 includes a wireless communication circuit that notifies the power transmission circuitry 2 of a power reception state indicating whether the currently receiving power (the power received by the power reception circuitry from the power transmission circuitry) is "sufficient," "excessive" or "insufficient" with respect to the required power (the power required by the power reception circuitry). In addition, the power reception circuitry 1 includes a circuit for preventing excessive power from being received when the receiving power is excessive. Further, the power transmission circuitry 2 includes a circuit for receiving the power reception state from the power reception circuitry 1, and a circuit for controlling transmission power according to the receiving power reception state. Then, it is possible to supply appropriate (proper) power to all of the power reception circuitry 1 in the wireless power transmission system by performing the following operations by the power reception circuitry 1 and the power transmission circuitry 2.

When receiving no power, the power reception circuitry 1 performs an operation of no power transmission (no power feeding) due to "no power reception." When receiving power, the power reception circuitry 1 sends a notification to the power transmission circuitry 2 in accordance with power being received (receiving power), operation power required by the power reception circuitry 1, charging power (required power), and allowable (acceptable) power. That is, the power reception circuitry 1 notifies the power transmission circuitry 2 of one of "power insufficient" (indicating that the receiving power is insufficient for the required power), "power appropriate" (indicating that the receiving power is sufficient for the required power), and "power excessive" (indicating that the receiving power is excessive). The states of "power insufficient," "power appropriate" or "power excessive" indicate the power reception state (receiving power state) of the power reception circuitry 1.

In the "power excessive" state, in order to reduce or eliminate the power received from the power transmission circuitry 2 to prevent a circuit breakage of the power reception circuitry 1, for example, the resonance frequency of the power receiving coil is changed by adjusting the L component or the C component of the power receiving coil. Alternatively, control is performed to reduce the receiving power such that the power receiving by the power receiving coil is not consumed by making the power receiving coil in a short-circuited state. Here, in a case where the reduction of the receiving power is implemented by changing the resonance frequency of the power receiving coil or by short-circuiting of the power receiving coil, when a specific power reception circuitry 1 reduces the receiving power, the power is absorbed by another power reception circuitry 1 that is not in the "power excessive" state, thereby preventing the power of the entire system from being wasted.

Figure 2:
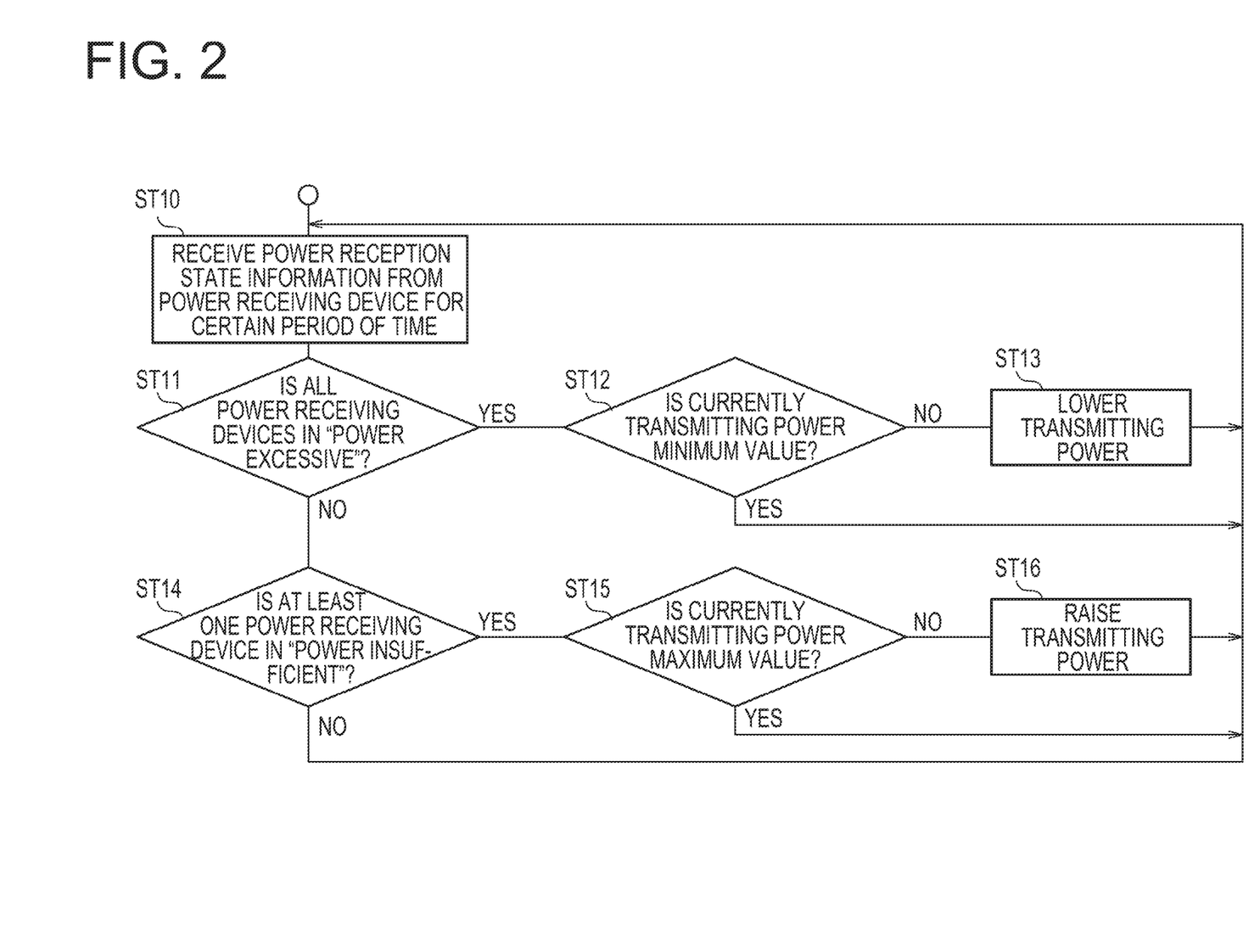
FIG. 2 is a flowchart for explaining an example of a process of a power transmission circuitry in a wireless power transmission system according to an embodiment.

FIG. 2 is a flowchart for explaining an example of a process of the power transmission circuitry in the wireless power transmission system according to the present embodiment. In the power transmission circuitry 2, first, in step ST10, the communication circuit (receiver) 20 of the power transmission circuitry 2 is operated for a certain period of time to wirelessly receive the power reception state information (information on the receiving power) of the power reception circuitry 1 requiring power, and the process proceeds to step ST11. In step ST11, it is determined whether or not all the power reception circuitry 1 are in the "power excessive" state. When it is determined that all the power reception circuitry 1 are in the "power excessive" state, the process proceeds to step ST12. In step ST12, it is determined whether or not the currently transmitting power is the minimum value for the power transmission circuitry 2. When it is determined that the currently transmitting power is not the minimum value, the process proceeds to step ST13 in which the transmitting power is lowered. Thereafter, the process returns to step ST10 to repeat the steps as described above. When it is determined in step ST12 that the currently transmitting power is the minimum value, the process directly returns to step ST10.

Next, when it is determined in step ST11 that all the power reception circuitry 1 are not in the "power excessive" state, the process proceeds to step ST14 in which it is determined whether or not at least one power reception circuitry 1 is in the "power insufficient" state. When it is determined in step ST14 that at least one power reception circuitry 1 is in the "power insufficient" state, the process proceeds to step ST15 in which it is determined whether or not the currently transmitting power is the maximum value for the power transmission circuitry 2. When it is determined that the currently transmitting power is the maximum value, the process returns to step ST10. When it is determined in step ST15 that the currently transmitting power is not the maximum value, the process proceeds to step ST16 in which the transmitting power is increased. Thereafter, the process returns to step ST10 to repeat the steps as described above.

As described above, the power transmission circuitry 2 is controlled such that the plural power reception circuitry 1 to which the power from the power transmission circuitry 2 may be wirelessly and simultaneously transmitted are in the "power appropriate" state or the "power excessive" state, as long as the power transmission capability of the power transmission circuitry 2 is permitted. That is, the power transmission circuitry 2 is controlled such that all the power reception circuitry 1 are in the "power appropriate" state, or at least one of the power reception circuitry 1 is the "power appropriate" state and the other power reception circuitry 1 are in the "power excessive" state. For example, when the plural power reception circuitry 1 are arranged on the power transmission circuitry 2, the states of all the power reception circuitry 1 may be set to the "power appropriate" state or the "power excessive" state. In the power reception circuitry 1 that is in the "power excessive" state, it is possible to protect the circuit by limiting the power received by the power reception circuitry itself. Further, when all the power reception circuitry 1 are in "power excessive" state, the power transmission circuitry 2 lowers the transmitting power so that the power consumption of the wireless power transmission system may be reduced.

Figure 3:
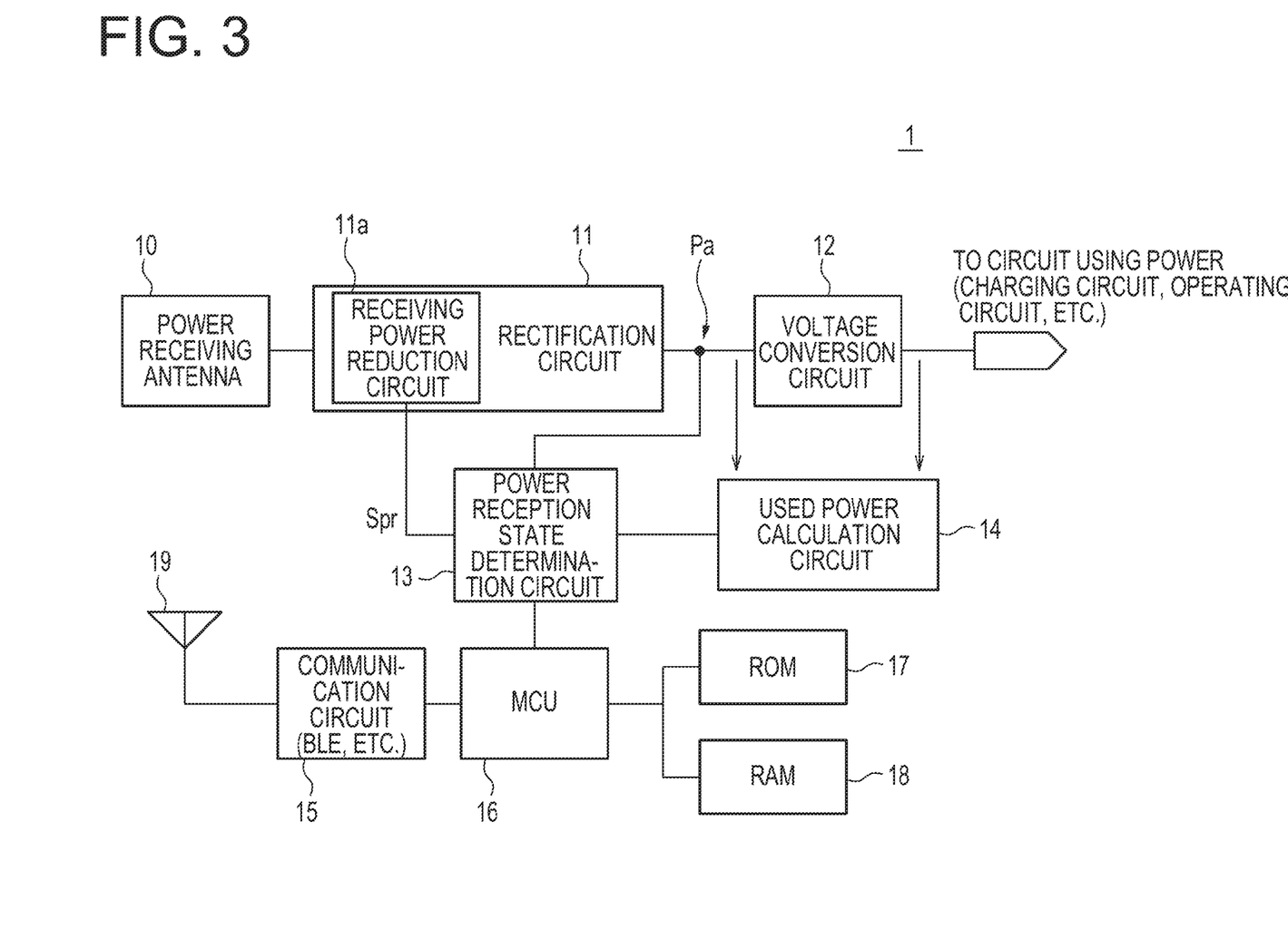
FIG. 3 is a block diagram illustrating a first Example of a power reception circuitry.

FIG. 3 is a block diagram illustrating a first example of a power reception circuitry. As illustrated in FIG. 3, a power reception circuitry 1 of the first example includes a power receiving antenna 10, a rectification circuit 11, a voltage conversion circuit 12, a power reception state determination circuit 13, a used power calculation circuit 14, a communication circuit 15, an MCU 16, a ROM 17, a RAM 18, and a communication antenna 19. For example, the power receiving antenna 10 corresponds to the power receiving coil (power receiving resonance coil) that receives the power from a power transmission circuitry 2 by using the magnetic field resonance. For example, the inductance (L) component or the capacitance (C) component of the power receiving antenna 10 may be adjusted.

The rectification circuit 11 includes a receiving power reduction circuit 11a having a function of measuring and reducing the receiving power, rectifies an AC voltage from the power receiving antenna 10, and outputs a DC voltage to the voltage conversion circuit 12 via a node Pa. The voltage conversion circuit 12 is, for example, a DC/DC converter and converts the output voltage of the rectification circuit 11 into a voltage suitable for a circuit (e.g., a charging circuit or an operation circuit) in the subsequent stage using power. Here, the receiving power reduction circuit 11a, the power reception state determination circuit 13, the used power calculation circuit 14, and the MCU 16 form, for example, a receiving power control circuit that controls the receiving power in the power reception circuitry 1.

The power reception state determination circuit 13 compares the receiving power, the required power, and the maximum power (the maximum power that the power reception circuitry 1 may receive without causing a failure) received by the voltage conversion circuit 12. When receiving the power, the power reception state determination circuit 13 determines the power reception state. The used power calculation circuit 14 calculates the power currently used by, for example, the charging circuit or the operation circuit. Here, the used power consumption calculation circuit 14 measures one or some of voltages and currents before (input)/after (output) the voltage conversion circuit 12, and calculates power used in a circuit of the subsequent stage. The used power calculation circuit 14 may be combined with, for example, the power reception state determination circuit 13 to form one circuit.

The communication circuit (communication circuit on the power receiving side) 15 is to perform a wireless communication with the power transmission circuitry 2 by applying, for example, Bluetooth® low energy (BLE). The MCU (Micro Control Unit) (power receiving side MCU) 16 is connected to, for example, the power reception state determination circuit 13, the communication circuit 15, the ROM (Read Only Memory) 17, and the RAM (Random Access Memory) 18, and performs various controls of, for example, the receiving power reduction circuit 11a. That is, when the power is received, the power reception state determination circuit 13 determines whether the power reception circuitry 1 is in the state of "power insufficient," "power appropriate" or "power excessive," and outputs the determination result to the MCU 16. When the determination result is "power excessive," the power reception state determination circuit 13 outputs a receiving power reduction signal Spr to the rectification circuit 11 (the receiving power reduction circuit 11a) to reduce the receiving power.

Figure 4:
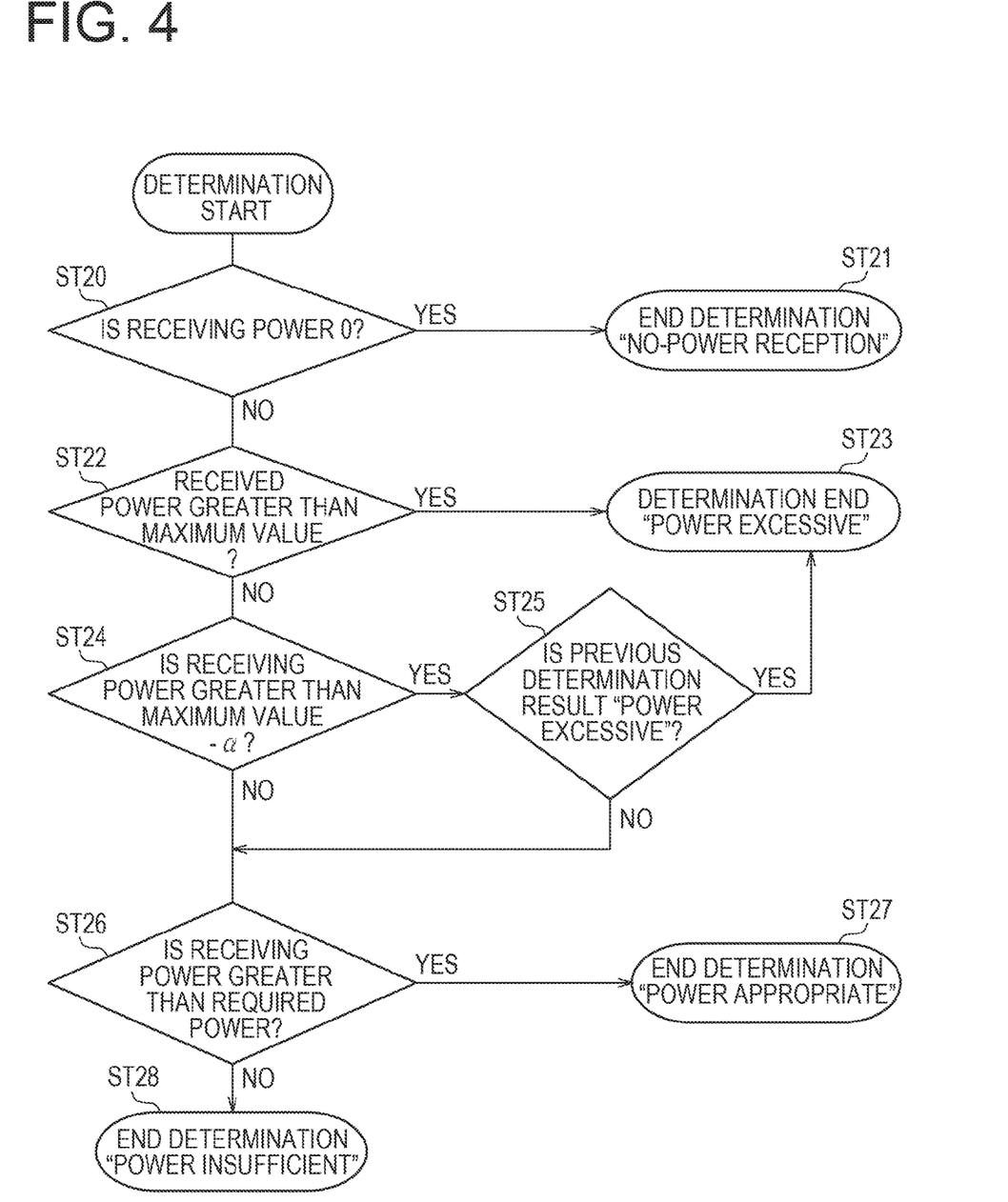
FIG. 4 is a flowchart for explaining an example of a process of a power reception state determination circuit in the power reception circuitry illustrated in FIG. 3.

FIG. 4 is a flowchart for explaining an example of a process of the power reception state determination circuit in the power reception circuitry illustrated in FIG. 3. When a determination process starts, first, in step ST20, the power reception state determination circuit 13 determines whether or not the receiving power is zero. When it is determined that the receiving power is not zero, the process proceeds to step ST22 where it is determined that the receiving power is greater than the maximum power. Here, the maximum power indicates the maximum power that may be received by the power reception circuitry 1 without causing a failure as described above. When it is determined in step ST22 that the receiving power is greater than the maximum power, the process proceeds to step ST23 in which the determination process is terminated with "power excessive." When it is determined in step ST20 that the receiving power is zero, the process proceeds to step ST21 in which the determination process is terminated with "no power reception."

Next, when it is determined in step ST22 that the receiving power is not greater than the maximum power, the process proceeds to step ST24 in which it is determined whether or not the receiving power is greater than the maximum power-α. Here, α (minute portion) may be, for example, about 10% of the maximum power, and a flexible determination having a margin is performed by determining whether or not the receiving power is greater than a value obtained by subtracting about 10% (α) from the maximum power. That is, when it is determined in step ST24 that the receiving power is greater than the maximum power-α, the process proceeds to step ST25 in which it is determined whether or not the previous determination result is "power excessive." When it is determined that the previous determination result is "power excessive," the process proceeds to step ST23 in which the determination process is terminated with "power excessive."

Meanwhile, when it is determined in step ST24 that the receiving power is not greater than the maximum power-α, the process proceeds to step ST26 in which it is determined whether the receiving power is greater than the required power. When it is determined in step ST25 that the previous determination result is not "power excessive," the process proceeds to step ST26. Then, when it is determined in step ST26 that the receiving power is greater than the required power, the process proceeds to step ST27 in which the determination process is terminated with "power appropriate." When it is determined in step ST26 that the receiving power is not greater than the required power, the process proceeds to step ST28 in which the determination process is terminated with "power insufficient." The above-described determination process in the power reception state determination circuit 13 is always performed, for example, during the operation of the power reception circuitry 1.

Figure 5:
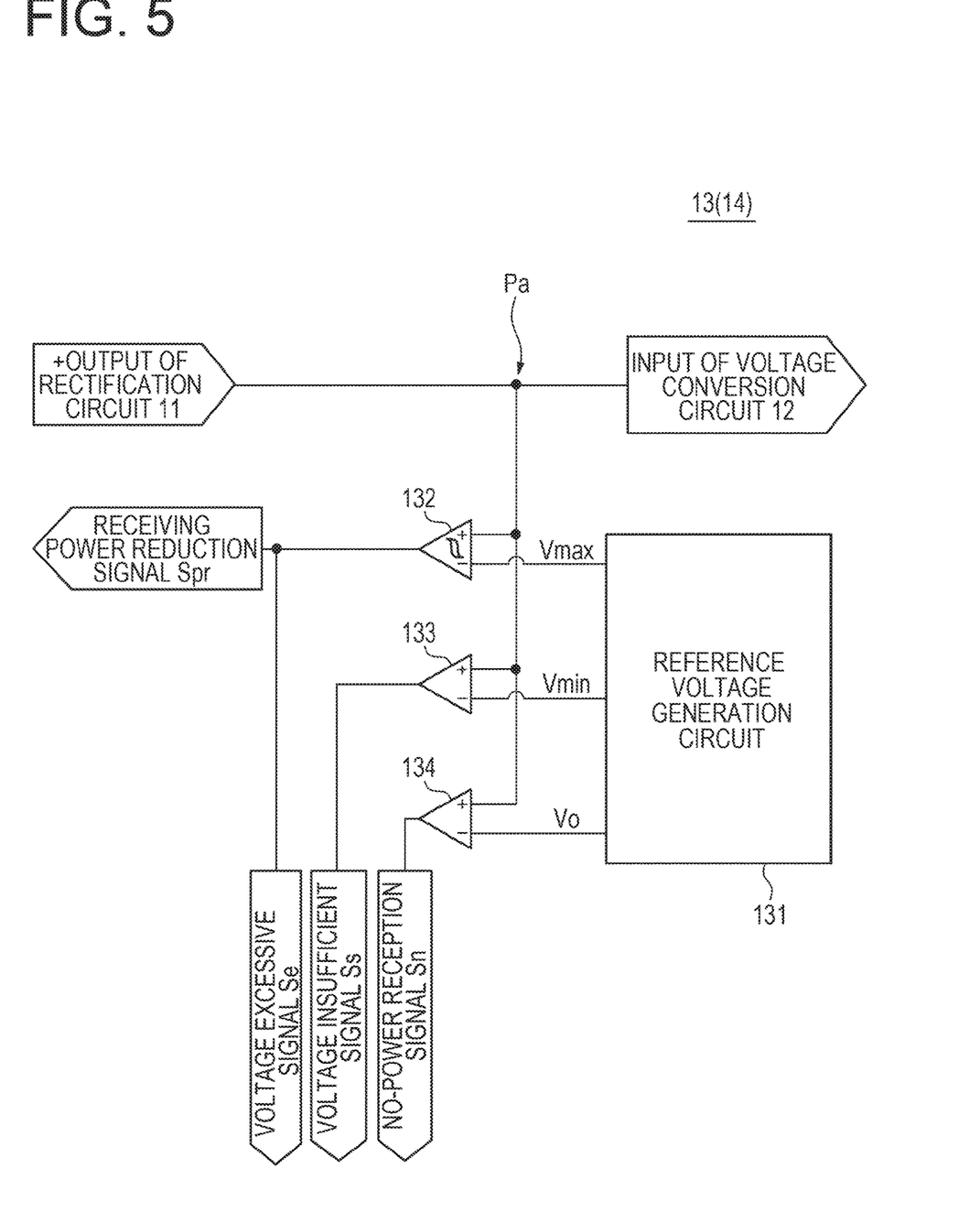
FIG. 5 is a block diagram illustrating an example of a power reception state determination circuit and a used power calculation circuit in the power reception circuitry illustrated in FIG. 3.

FIG. 5 is a block diagram illustrating an example of the power reception state determination circuit and the used power calculation circuit in the power reception circuitry illustrated in FIG. 3, in which the power reception state determination circuit 13 and the used power calculation circuit 14 are combined to form one circuit. As illustrated in FIG. 5, the power reception state determination circuit 13 (the used power calculation circuit 14) includes a reference voltage generation circuit 131, a hysteresis comparator 132, and comparators 133 and 134. Here, the hysteresis comparator 132 is to give "α" to be deducted from the above-mentioned maximum power. A voltage of a node Pa (the +output of the rectification circuit 11 and the input of the voltage conversion circuit 12) is input to one input (+) of each of the hysteresis comparator 132 and the comparators 133 and 134. A predetermined voltage from the reference voltage generation circuit 131 is input to the other input (−) of each of the hysteresis comparator 132 and the comparators 133 and 134.

Here, when a step-down converter (Buck type DC/DC converter) is applied as the voltage conversion circuit 12, for example, when the power consumption is less than the input power of the step-down converter, the input voltage rises. Conversely, when the power consumption is more than the input power of the step-down converter, the input voltage drops. That is, the voltage of the node Pa rises gradually when the receiving power cannot be completely consumed by the voltage conversion circuit 12 in the subsequent stage, and drops when the used power in the subsequent stage exceeds the receiving power. Therefore, by monitoring the input voltage (the voltage of the node Pa) of the voltage conversion circuit 12, it is also possible to determine whether the receiving power is larger than the used power or the receiving power is smaller than the used power.

The hysteresis comparator 132 compares the voltage of the node Pa with the maximum operating voltage Vmax of the voltage conversion circuit 12 which is generated by the reference voltage generation circuit 131. When the voltage of the node Pa exceeds the maximum operating voltage Vmax, the hysteresis comparator 132 outputs a receiving power reduction signal Spr to the rectification circuit 11 (the receiving power reduction circuit 11a) and outputs (asserts) a voltage excessive signal Se to the MCU 16. Further, the comparator 133 compares the voltage of the node Pa with the minimum voltage Vmin generated by the reference voltage generation circuit 131 at which the voltage conversion circuit 12 may operate. When the voltage of the node Pa falls below the minimum voltage Vmin, a voltage insufficient signal Ss is output to the MCU 16. Further, the comparator 134 compares the voltage of the node Pa with a voltage Vo near 0V and outputs a no-voltage signal Sn to the MCU 16 when the voltage of the node Pa is a voltage Vo near 0V.

When all of the voltage excessive signal Se, the voltage insufficient signal Ss, and the no-voltage signal Sn are negated, the power reception circuitry is in the voltage appropriate state. When the no-voltage signal Sn is asserted, the power reception circuitry is in the no-power reception state, irrespective of the states of the voltage insufficient signal Ss and the voltage excessive signal Se. Here, in addition to the method of detecting the voltage of the node Pa, for example, a method of detecting the amount of current flowing from, for example, the voltage conversion circuit 12 may be applied for the detection of the used power. In addition, for example, an A/D converter may be used to digitally convert the voltage of the node Pa or the amount of current flowing from the voltage conversion circuit 12, which is fetched into the MCU 16 to implement functions equivalent to those of the comparators 132 to 134 by software. Thus, the above-described operations of the power reception state determination circuit 13 and the used power calculation circuit 14 may be implemented.

Figure 6:
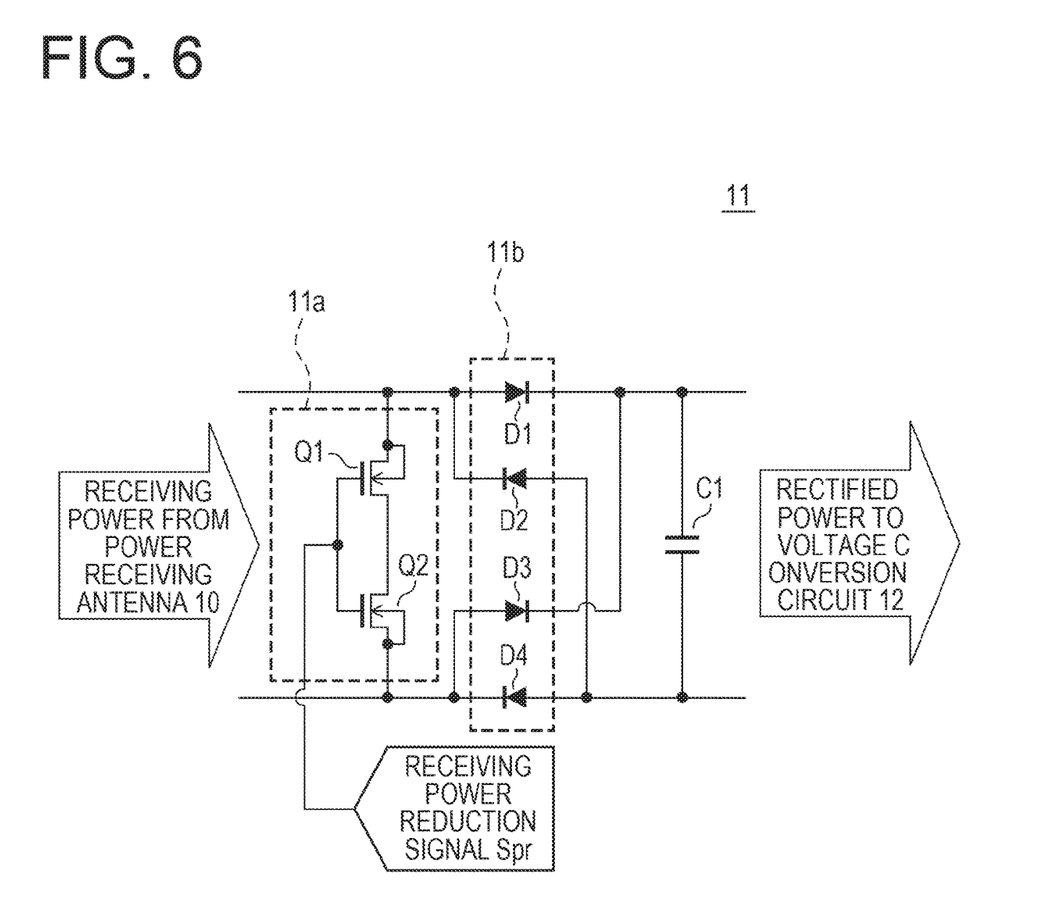
FIG. 6 is a block diagram illustrating an example of a rectification circuit illustrated in FIG. 3.

FIG. 6 is a block diagram illustrating an example of the rectification circuit illustrated in FIG. 3. As illustrated in FIG. 6, the rectification circuit 11 includes a receiving power reduction circuit 11a, a rectification circuit 11b, and a capacitor C1. The rectification circuit 11b includes four diodes D1 to D4 to perform bridge rectification. A rectified voltage is smoothed by the capacitor C1 and output to the voltage conversion circuit 12. That is, an AC voltage from the power receiving antenna 10 is smoothed by the rectification circuit 11b and the capacitor C1 and output to the voltage conversion circuit 12.

The receiving power reduction circuit 11a includes two n-channel MOS (nMOS) transistors Q1 and Q2. For example, when the above-mentioned receiving power reduction signal Spr is asserted (output) and has a high level "H", the nMOS transistors Q1 and Q2 are turned ON. As a result, the AC voltage (power) from the power receiving antenna 10 is interrupted to reduce the receiving power. When the receiving power reduction signal Spr is negated, the receiving power reduction signal Spr has a low level "L", the nMOS transistors Q1 and Q2 are turned OFF, and the AC voltage from the power receiving antenna 10 is directly input to the rectification circuit 11b.

That is, when the power reception state is "power appropriate" or "power insufficient," the receiving power reduction signal Spr from the power reception state determination circuit 13 is negated and the transistors Q1 and Q2 are turned OFF to perform the operation of the normal rectification circuit 11. When the power reception state becomes "power excessive," the receiving power reduction signal Spr from the power reception state determination circuit 13 is asserted and the transistors Q1 and Q2 are turned ON to make the output of the power receiving antenna 10 short-circuited to receive no power. As a result, it is possible to reduce the receiving power.

In addition, the rectification circuit 11 illustrated in FIG. 6 is merely an example, and the receiving power reduction circuit 11a and the rectification circuit 11b are not limited to those in FIG. 6 but may be configured in different ways. For example, a transistor may be used as the rectification circuit 11b, and the power may be compared by a comparator. Further, various changes and modifications such as disposing the used power calculation circuit 14 at the front stage of the rectification circuit 11 may be made.

Alternatively, as the receiving power reduction circuit 11a, for example, in the power reception circuitry 1 in the "power excessive" state, the resonance frequency of the power receiving coil may be changed by adjusting the L component and the C component of the power receiving antenna (power receiving resonance coil) 10 to reduce the receiving power.

Figure 7:
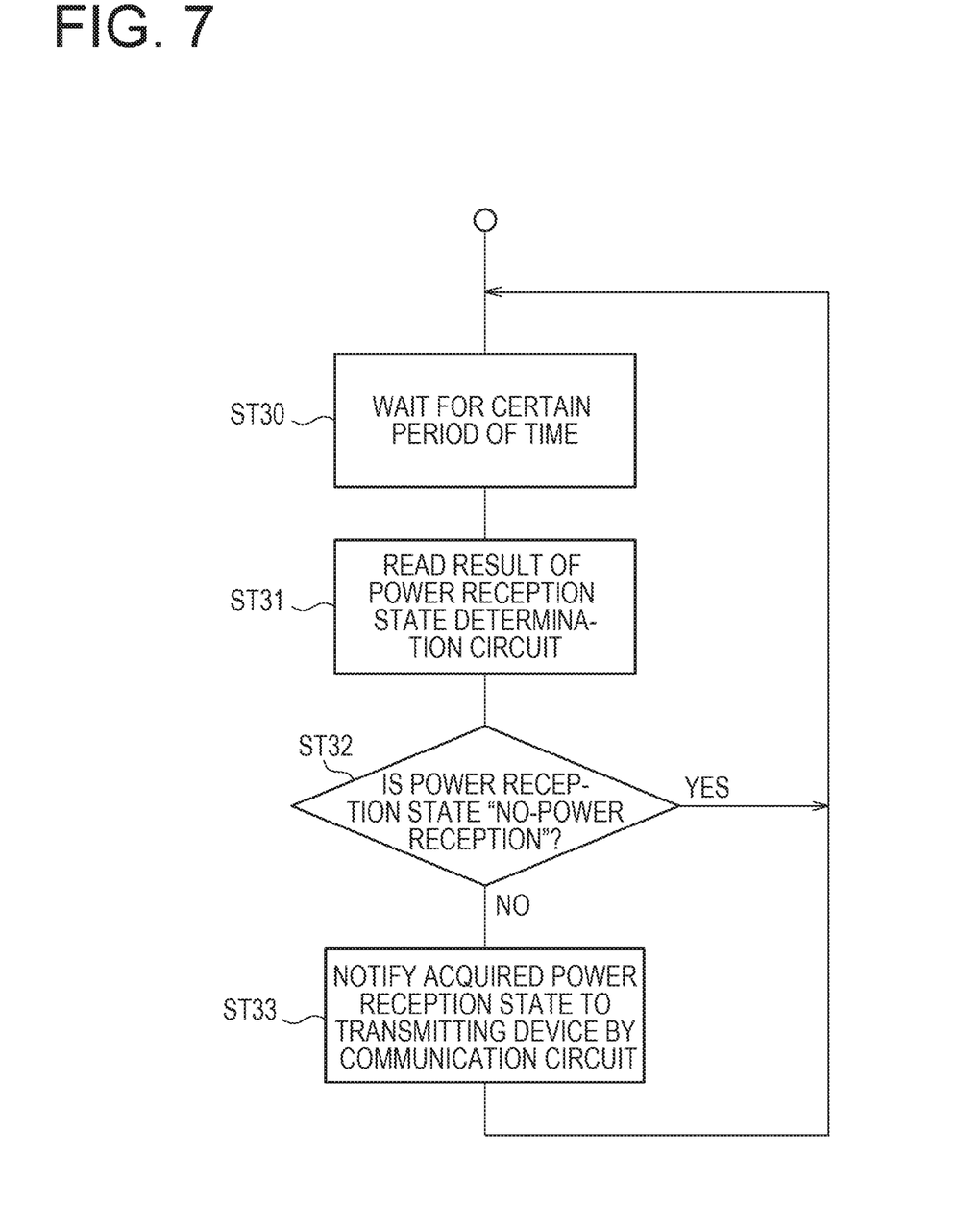
FIG. 7 is a flowchart for explaining an example of a process of the power reception circuitry illustrated in FIG. 3.

FIG. 7 is a flowchart for explaining an example of a process of the power reception circuitry illustrated in FIG. 3. In the power reception circuitry 1, first, in step ST30, the process waits for a predetermined time. Then, the process proceeds to step ST31 in which the determination result (power reception state) from the power reception state determination circuit 13 is read. Next, the process proceeds to step ST32 in which it is determined whether or not the power reception state is "no-power reception." When it is determined that the power reception state is "no-power reception," the process returns to step ST30 to repeat the steps described above.

When it is determined in step ST32 that the power reception state is not "no-power reception," the process proceeds to step ST33 in which the communication circuit 15 notifies the power transmission circuitry 2 of the acquired power reception state. Then, the process returns to step ST30 to repeat the steps described above. Through the above operation, while the power reception circuitry 1 receives power from the power transmission circuitry 2, the power reception state of the power reception circuitry 1 is periodically notified to the power transmission circuitry 2.

Figure 8:
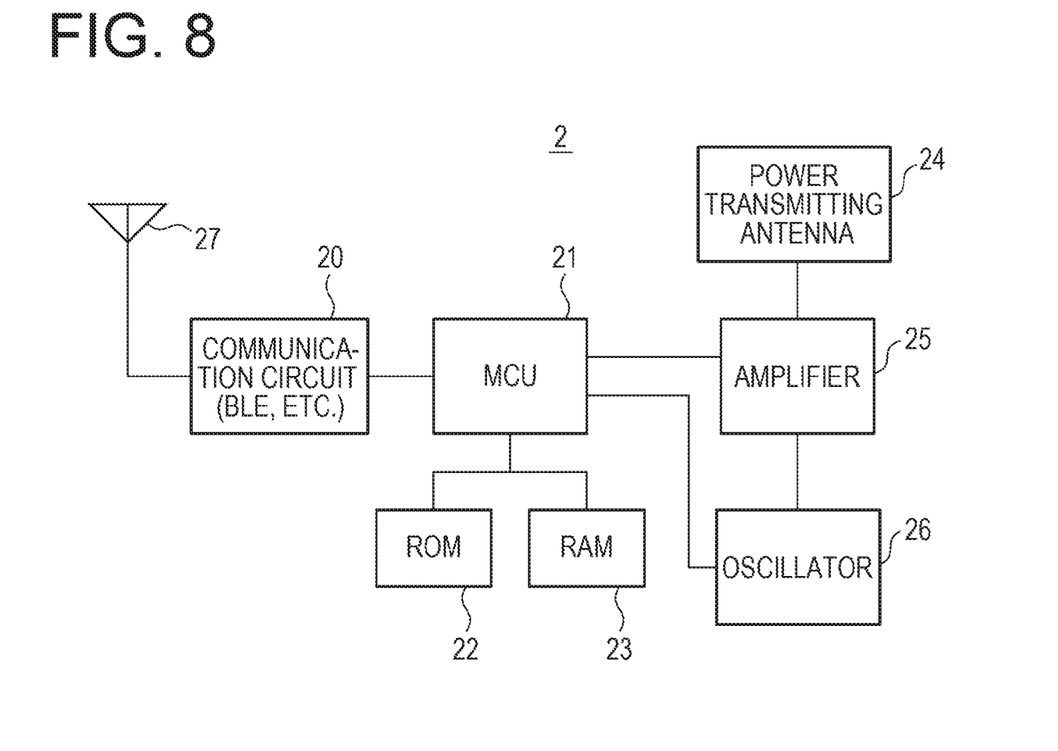
FIG. 8 is a block diagram illustrating a first Example of a power transmission circuitry.

FIG. 8 is a block diagram illustrating a first example of a power transmission circuitry. As illustrated in FIG. 8, the power transmission circuitry 2 of the first example includes a communication circuit 20, an MCU 21, a ROM 22, a RAM 23, a power transmitting antenna 24, an amplifier 25, an oscillator 26, and a communication antenna 27. The communication circuit (communication circuit on the power transmitting side) 20 is to perform a wireless communication with the power reception circuitry 1 by applying, for example, Bluetooth® low energy (BLE). The MCU (MCU on the power transmitting side) 21 is connected to, for example, the communication circuit 20, the ROM 22, the RAM 23, the amplifier 25, and the oscillator 26 to perform various controls of, for example, the transmitting power. Here, the MCU 21, the amplifier 25, and the oscillator 26 form a transmitting power control circuit for controlling the transmitting power based on, for example, information (receiving power and the state of power) of the power reception circuitry 1 received by the communication circuit 20.

The power transmitting antenna 24 is used to wirelessly transmit power to the power reception circuitry 1 via the power receiving antenna 10 by using, for example, the resonance of a strongly-coupled system such as magnetic field resonance or electric field resonance. As described above, the application of the present example is not limited to the use of the resonance of the strongly-coupled system. For example, electromagnetic induction may be used as long as the power from one power transmission circuitry 2 (the power transmitting antenna 24) may be wirelessly and simultaneously transmitted to plural power reception circuitry 1 (power receiving antennas 10).

The oscillator 26 generates an electromagnetic wave having a frequency used for power transmission. The amplifier 25 amplifies the electromagnetic wave from the oscillator 26 and outputs the amplified electromagnetic wave via the power transmitting antenna 24. In addition, the communication circuit 20 is used not only to receive, for example, the power reception state (information on the receiving power) from the plural power reception circuitry 1 but also to exchange other various data. In addition, the power transmission circuitry 2 illustrated in FIG. 8 is merely an example but may be changed and modified in various ways. Further, the respective components may be formed as one package. That is, the components such as the communication circuit 20, the MCU 21, the ROM 22, and the RAM 23 may be integrated into an SoC (System on Chip) or a logic circuit incorporating a control flow to be described later. Further, the communication circuit 20 may be, for example, a receiver having only the reception function of receiving data from the power reception circuitry 1.

Here, the power transmission circuitry 2 periodically receives the state (power reception state) of the power reception circuitry 1 by the communication circuit 20, operates the oscillator 26 and the amplifier 25 when there is a power reception circuitry 1 that receives power from the power transmission circuitry 2, and starts the power transmission via the power transmitting antenna 24. When the power reception state of the power reception circuitry 1 cannot be acquired by the communication circuit 20, that is, when there is no power reception circuitry 1 that receives power from the power transmission circuitry 2, the oscillator 26 and the amplifier 25 are stopped to terminate the power transmission.

Then, after checking the power reception state of the plural power reception circuitry 1, when all the power reception circuitry 1 are notifying the "power excessive" state, the transmitting power is decreased, for example, by lowering the amplification factor of the amplifier 25. When at least one power reception circuitry 1 is notifying the "power insufficient" state, the transmitting power is increased, for example, by increasing the amplification factor of the amplifier 25. The process in the power transmission circuitry 2 of the first example is as described above with reference to FIG. 8.

Figure 9:
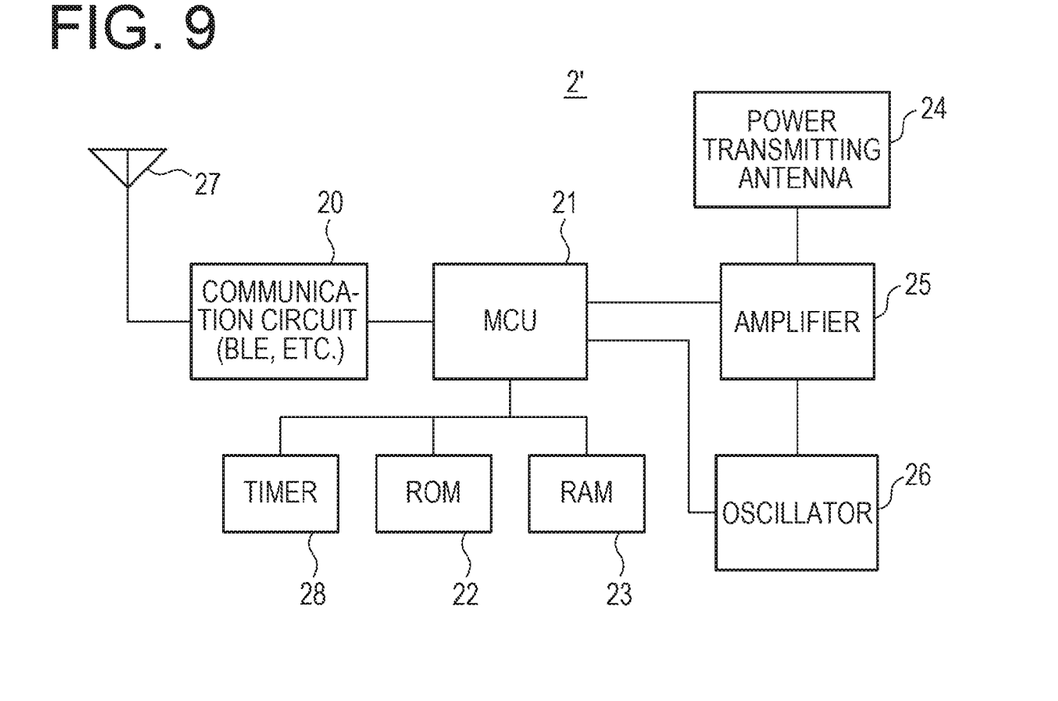
FIG. 9 is a block diagram illustrating a second Example of a power transmission circuitry.

FIG. 9 is a block diagram illustrating a second example of a power transmission circuitry. As apparent from the comparison between FIG. 9 and FIG. 8 described above, a power transmission circuitry 2' of the second example includes a timer 28 added to the power transmission circuitry 2 of the first example. The power transmission circuitry 2 of the first example described above outputs no power, for example when almost all the power of the battery mounted on the power reception circuitry 1 is consumed and the power reception state ("power insufficient") cannot be communicated to the power transmission circuitry 2 by driving the communication circuit 15 of the power reception circuitry 1.

Even when it is determined that the power reception circuitry 1 does not exist, the power transmission circuitry 2' of the second example constantly transmits power (only for a predetermined time) to the power reception circuitry 1 in which almost all the power of the battery has been consumed. The power reception circuitry 1 and its process may be the same as described above with reference to FIGS. 3 to 7. In addition to the communication circuit 20, the MCU 21, the ROM 22, and the RAM 23, the timer 28 may also be integrated into the SoC.

Here, the process of the power transmission circuitry 2' of the second example may be divided into a process in a case where the presence of a power reception circuitry is not detected and a process in a case in which the presence of a power reception circuitry is detected. The process described above with reference to FIG. 2 may be applied to the process in the case where the presence of a power reception circuitry is detected. In the initial state, for example, the oscillator 26 and the amplifier 25 in the power transmission circuitry 2 are stopped, and a process is started with the assumption that the presence of the power reception circuitry 1 is not detected.

Figure 10:
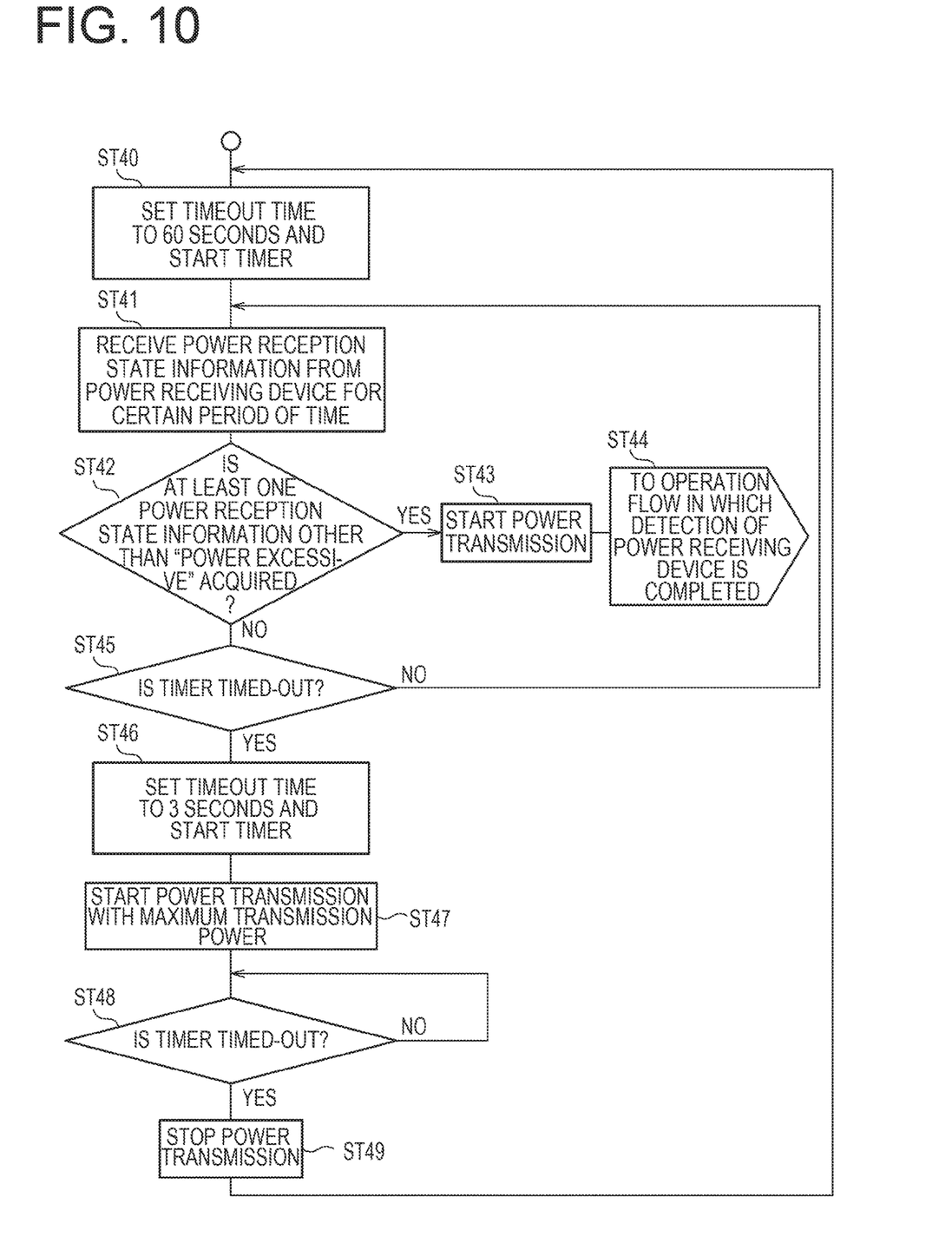
FIG. 10 is a flowchart for explaining an example of a process of a power transmission circuitry in a case where the presence of a power reception circuitry is not detected.

FIG. 10 is a flowchart for explaining an example of a process of a power transmission circuitry in the case where the presence of a power reception circuitry is not detected, and represents an example of a process in the power transmission circuitry 2' of the second example in a case where the presence of a power reception circuitry is not detected. In the power transmission circuitry 2' of the second example, first, in step ST40, for example, the timer 28 is started with the timeout time set to 60 seconds, and, the process proceeds to step ST41. In addition, the timeout time set in step ST40 may be set to any time as long as the timeout time is sufficiently longer than the timeout time (3 seconds) set in step ST46 to be described later. In step ST41, the communication circuit 20 of the power transmission circuitry 2' is operated for a certain period of time to receive the power reception state information (information on the receiving power) from the power reception circuitry 1. Then, the process proceeds to step ST42 in which it is determined whether or not at least one power reception state information other than the "power excessive" state has been acquired.

When it is determined in step ST42 that at least one power reception state information other than the "power excessive" state has been acquired, that is, when it is determined that there is at least one power reception circuitry 1 requiring power, the process proceeds to step ST43 in which power transmission is started. Then, the process proceeds to step ST44. Here, the step ST44 corresponds to FIG. 2 which is an example of the process when the presence of the power reception circuitry 1 is detected, and is transitioned to the process of the flowchart illustrated in FIG. 2.

Meanwhile, when it is determined in step ST42 that none of the power reception state information other than the "power excessive" state has been acquired, the process proceeds to step ST45 in which it is determined whether or not the timer 28 is time-out. When it is determined in step ST45 that the timer 28 is time-out (60 seconds has elapsed), the process proceeds to step ST46 in which the timer 28 is started with the timeout time set to, for example, 3 seconds. Then, the process proceeds to step ST47. When it is determined in step ST45 that the timer 28 is not time-out, the process returns to step ST41 to repeat the steps as described above.

In step ST47, power transmission is started with maximum transmission power. Then, the process proceeds to step ST48 in which it is determined whether or not the timer 28 is time-out. When it is determined that the timer 28 is time-out (3 seconds has elapsed), the process proceeds to step ST49 in which the power transmission is stopped. Then, the process returns to step ST40. When it is determined in step ST48 that the timer 28 is not time-out, the power transmission is continued.

Thus, according to the second example, for example, even when the almost all the power of the battery of the power reception circuitry 1 is consumed and the current power reception state may not be transmitted by driving the communication circuit 15 of the power reception circuitry1, the power transmission circuitry 2 transmits power at regular time intervals. Then, by receiving the power transmitted at regular time intervals, the power reception circuitry 1 accumulates the power until the communication circuit 15 can be operated, and communicates the power reception state to the power transmission circuitry 2, so that the power reception circuitry 1 may become in the normal power reception state.

Figure 11:
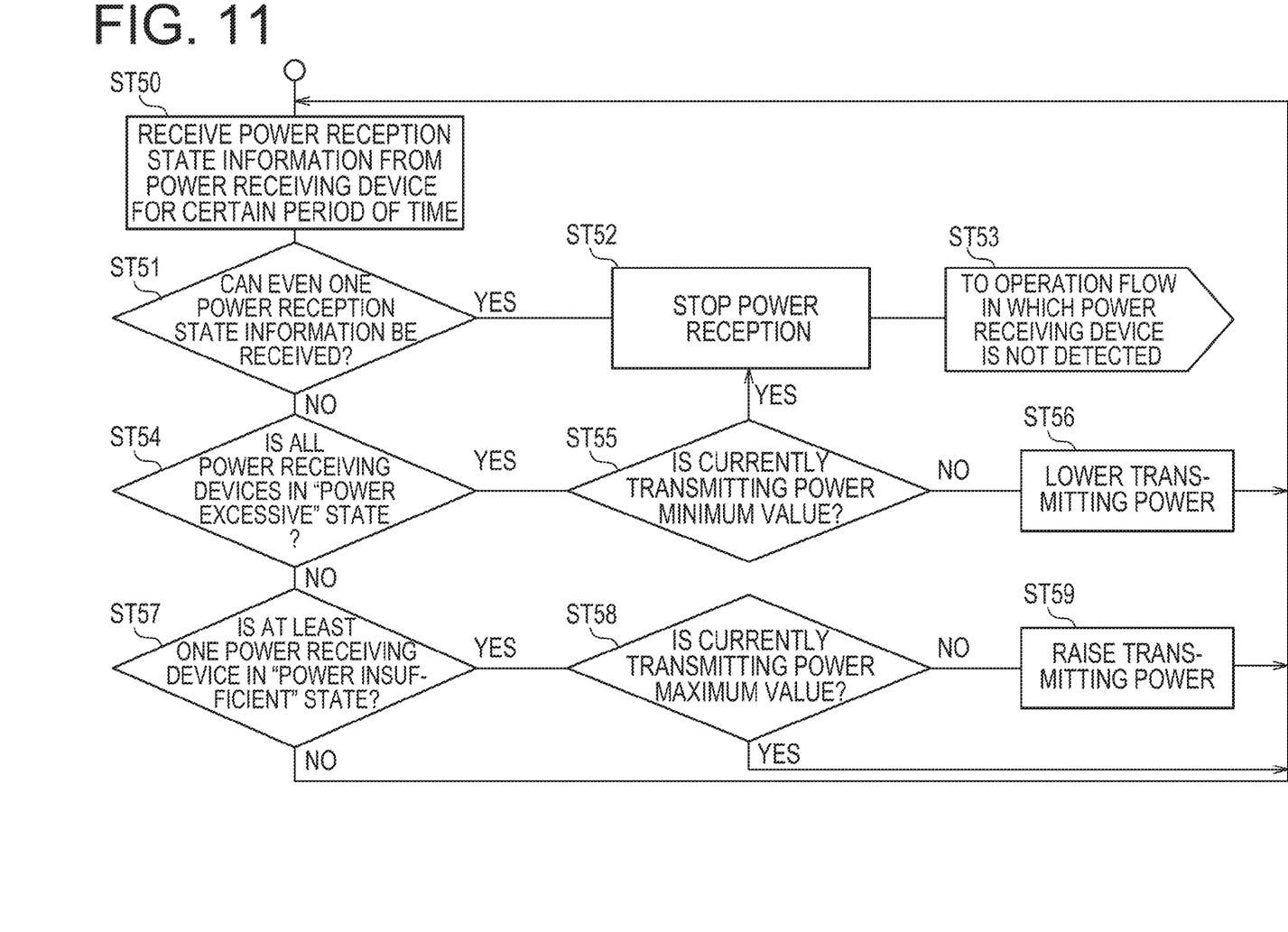
FIG. 11 is a flowchart for explaining an example of a process of a power transmission circuitry when the presence of a power reception circuitry is detected.

FIG. 11 is a flowchart for explaining an example of a process of a power transmission circuitry in the case where the presence of a power reception circuitry is detected, and represents an example of a process in the power transmission circuitry 2' of the second example in a case where the presence of a power reception circuitry is detected. In the power transmission circuitry 2' of the second example, first, in step ST50, the communication circuit 20 of the power transmission circuitry 2' is operated for a predetermined period of time to receive the power reception state information of the power reception circuitry 1 that needs power. Then, the process proceeds to step ST51 in which it is determined whether or not even one power reception state information may be received. When it is determined that none of the power reception state information may be received, it is determined that none of power reception circuitry 1 exists. Then, the process proceeds to step ST52 in which the power transmission is stopped. Then, the process proceeds to step ST53. Here, the step ST53 corresponds to FIG. 10 illustrating an example of the process when the presence of the power reception circuitry 1 is not detected, and is transitioned to the process of the flowchart illustrated in FIG. 10.

Meanwhile, when it is determined in step ST51 that the power reception state information may be received from at least one power reception circuitry 1, the process proceeds to step ST54 in which it is determined whether or not all the power reception circuitry 1 are in the "power excessive" state. When it is determined in step ST54 that all the power reception circuitry 1 are in the "power excessive" state, the process proceeds to step ST55 in which it is determined whether or not the currently transmitting power is the minimum value for the power transmission circuitry 2'. When it is determined in step ST55 that the currently transmitting power is not the minimum value, the process proceeds to step ST56 in which the transmitting power is lowered. Then, the process returns to step ST50 to repeat the steps as described above. When it is determined in step ST55 that the current transmitting power is the minimum value, the process proceeds to step ST52 in which the power transmission is stopped. Then, the process proceeds to step ST53.

Next, when it is determined in step ST54 that all the power reception circuitry 1 are not in the "power excessive" state, the process proceeds to step ST57 in which it is determined whether or not at least one power reception circuitry 1 is in the "power insufficient" state. When it is determined in step ST57 that at least one power reception circuitry 1 is in the "power insufficient" state, the process proceeds to step ST58 in which it is determined whether or not the currently transmitting power is the maximum value for the power transmission circuitry 2'. When it is determined that the currently transmitting power is the maximum value, the process returns to step ST50. When it is determined in step ST58 that the currently transmitting power is not the maximum value, the process proceeds to step ST59 in which the power transmission power is raised. Then, the process returns to step ST50 to repeat the steps as described above.

Thus, according to the second example, when the power transmission circuitry 2' cannot detect the power reception circuitry 1, the power transmission may be stopped for most of the time. Further, as described above, even when the power reception circuitry 1 cannot communicate (transmit) the power reception state because of its low power, the power reception circuitry 1 may receive the minimum power from the power transmission circuitry 2' to operate the communication circuit 15 and the like to communicate the power reception state to the power transmission circuitry 2'.

As described above, according to the present example, in a wireless power transmission system capable of wirelessly transmitting power from one power transmission circuitry to plural power reception circuitry simultaneously, it is possible to simultaneously supply appropriate power to all the power reception circuitry while suppressing wasteful power consumption.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A power transmission circuitry that transmits power wirelessly to a plurality of power reception circuitry simultaneously, comprising:
    a communication circuit provided in a power transmitting side and configured to wirelessly receive information on receiving power of the plurality of power reception circuitry;
    a transmitting power control circuit configured to control transmitting power based on the information on receiving power of the plurality of power reception circuitry received by the communication circuit provided in the power transmitting side; and
    an antenna configured to output the transmitting power,
    wherein the transmitting power control circuit is configured to:
        determine whether all of the plurality of power reception circuitry has excessive power;
        determine, when all of the plurality of power reception circuitry has excessive power, whether currently transmitting power is a minimum value;
        lower the transmitting power when the currently transmitting power is not the minimum value;
        determine, when all of the plurality of power reception circuitry do not have excessive power, whether at least one of the plurality of power reception circuitry has insufficient power;
        determine, when the at least one of the plurality of power reception circuitry has the insufficient power, whether the currently transmitting power is a maximum value; and
        raise the transmitting power when the currently transmitting power is not the maximum value.

2. The power transmission circuitry according to claim 1, wherein the transmitting power control circuit is configured to control the transmitting power based on the information on receiving power of a power reception circuitry of the plurality of power reception circuitry which is required to have the largest power in all of the plurality of power reception circuitry.

3. The power transmission circuitry according to claim 1, further comprising a timer that sets time, wherein, when the communication circuit provided in the power transmitting side cannot receive any information on the receiving power of the plurality of power reception circuitry, the transmitting power control circuit controls to output the transmitting power based on the time set by the timer.

* * * * *